United States Patent
Zizzo

(10) Patent No.: US 6,578,174 B2
(45) Date of Patent: Jun. 10, 2003

(54) METHOD AND SYSTEM FOR CHIP DESIGN USING REMOTELY LOCATED RESOURCES

(75) Inventor: Claudio Zizzo, West Lothian (GB)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 09/877,419

(22) Filed: Jun. 8, 2001

(65) Prior Publication Data

US 2002/0188910 A1 Dec. 12, 2002

(51) Int. Cl.$^7$ .............................................. G06F 17/50
(52) U.S. Cl. ................................. 716/1; 716/2
(58) Field of Search ........................................ 716/1, 2

(56) References Cited

U.S. PATENT DOCUMENTS

| | | | |
|---|---|---|---|
| 5,862,223 A | | 1/1999 | Walker et al. |
| 5,878,408 A | | 3/1999 | Van Huben et al. |
| 5,933,356 A | * | 8/1999 | Rostoker et al. ............... 703/15 |
| 6,058,426 A | * | 5/2000 | Godwin et al. .............. 709/229 |
| 6,102,961 A | * | 8/2000 | Lee et al. ....................... 716/1 |
| 6,141,724 A | * | 10/2000 | Butler et al. .................... 711/11 |
| 6,269,467 B1 | | 7/2001 | Chang et al. |

FOREIGN PATENT DOCUMENTS

| | | | |
|---|---|---|---|
| EP | 0433066 | 6/1991 | |
| EP | 0944002 | 9/1999 | |
| EP | 1 063599 A2 * | 12/2000 | ............ G06F/17/50 |
| WO | WO 01/42969 * | 6/2001 | ............ G06F/17/00 |
| WO | WO 01/65422 | 9/2001 | |
| WO | WO 01/65422 A2 * | 9/2001 | ............ G06F/17/50 |
| WO | WO 01/65423 | 9/2001 | |

OTHER PUBLICATIONS

Rao et al. Web–Based Network Analysis and Design, ACM Transactions on Modeling and Computer Simulation, vol. 10, Issue 1, pp. 18–38, Jan. 2000.*

Chan et al., WELD—An Environment for Web–Based Electronic Design, Proceedings of the 35$^{th}$ Design Automation Conference, pp. 146–151, May 1998.*

Wen et al., Concurrent–Simulation–Based Remote IP Evaluation over the Internet for System–on–a–Chip Design, 14$^{th}$ International Symposium on System Synthesis, pp. 233–238, Sep. 2001.*

Konduri et al., A Framework for Collaborative and Distributed Web–Based Design, Proceedings of the 36$^{th}$ Design Automation Conference, pp. 898–903, Jun. 1999.*

(List continued on next page.)

Primary Examiner—Matthew Smith
Assistant Examiner—A. M. Thompson
(74) Attorney, Agent, or Firm—Bingham McCutchen LLP

(57) ABSTRACT

A multi-faceted circuit design platform facilitates the design of circuits and chips by making it easier for designers to locate and incorporate available virtual component blocks into new designs. The platform provides designers with the necessary support data on the virtual component blocks and allows designers to perform integration and connectivity verification as well as basic functional verification. In addition, the platform may provide other tools and services, e.g., electronic design automation software, computing and processing resources, integrated circuit fabrication, etc. The tools and services may be from internal as well as external sources and may be provided in whole or in part. Further, the platform may facilitate purchase, lease, or other acquisitions of the tools and services offered through it. Access to the platform may be achieved through a variety of applications.

44 Claims, 12 Drawing Sheets

OTHER PUBLICATIONS

P. Wilsey, Web–Based Analysis and Distributed IP, Proceedings of the 1999 Winter Simulation Conference, pp. 1445–1453.*

M. Dalpasso et al., Specification and Validation of Distributed IP–based designs with JavaCAD, Proceedings of Design, Automation and Test in Europe, pp. 684–688, Mar. 1999.*

Benini, L. et al., "Distributed EDA tool integration: the PPP paradigm," Proceedings of the International Conference on Computer Design, Oct. 1996, IEEE, pp. 448–453.

Larson, N. et al., "Managing Design Processes: A Risk Assessment Approach," Nov. 1996, IEEE, pp. 749–759.

Orfali, R. et al., "Essential Client/Server Survival Guide," 1996, Katherine Showalter, $2^{nd}$ ed., pp. 228–233 and 476.

Zorian, Y., "Test requirements for embedded core–based systems and IEEE P1500," Nov. 1997, IEEE, pp. 191–199.

Blanchard, D., "EDA on the WWW PCB CAD," Printed Circuit Design, Miller Freeman, Feb. 1998, vol. 15, No. 2, pp. 34–37.

Geppert, L., "The Rising Tide of Web–Based Tools and Services Augurs the Next Sea Change in Electronic Design IC Design on the World Wide Web," IEEE Spectrum, Jun. 1998, vol. 35, No. 6, pp. 45–50.

Dieckman, D. et al., "DISCOE: Distributed Design and Analysis to Preserve Intellectual Property," Sep. 1998, IEEE, pp. 57–60.

Lee, Dong–Eun et al., "CADIC: Computer–aided design on internet with cryptosystem," Oct. 1998, IEEE, pp. 2670–2674.

Moretti, G., "Got IP?," Printed Circuit Design, Miller Freeman, Oct. 1998, vol. 15, No. 10, pp. 31–33.

Perrin, B., "Web–Based Circuit Engineering," Circuit Cellar INK, Mar. 1999, No. 104, pp. 28–30, 33, 35, 37–38.

Schindler, P. et al., "IP repository, a Web based IP reuse infrastructure," Custom Integrated Circuits, May 1999, IEEE, pp. 415–418.

Dalpasso, M. et al., "Virtual simulation of distributed IP–based designs," Jun. 1999, IEEE, 50–55.

Brglez, F. et al., "A universal client for distributed networked design and computing," Jun. 2001, IEEE, pp. 401–406.

* cited by examiner

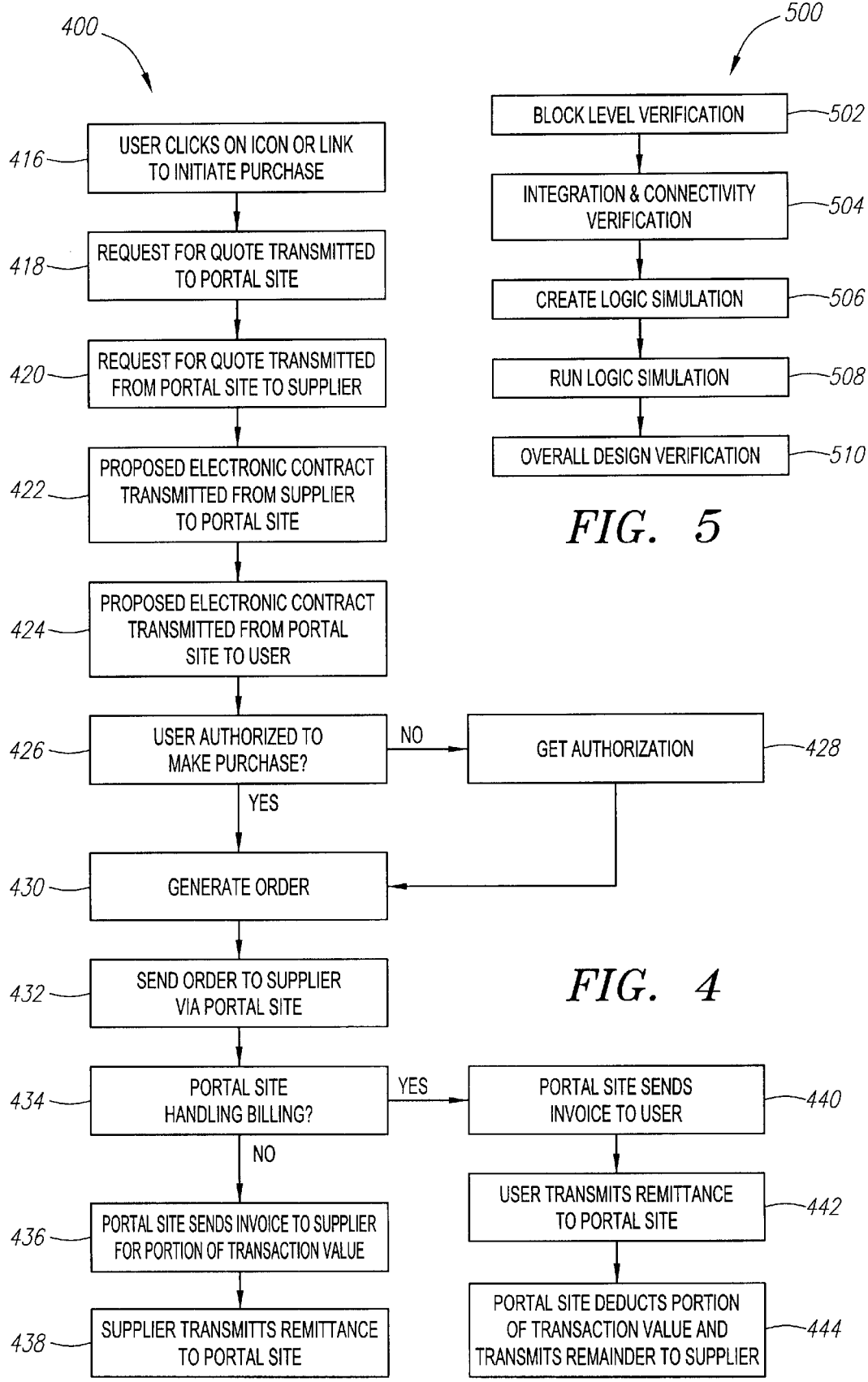

IP Creator:
- IP (VHDL, Verilog, C)
- Data Sheet
- Bug Report

IP CREATOR PUBLISHES THE IP

METHOD AND SYSTEM FOR CHIP DESIGN USING REMOTELY LOCATED RESOURCES

BACKGROUND OF THE INVENTION

1) Field of the Invention

The field of invention is related to electronic design tools and automation, and more specifically to methods and systems for facilitating electronic circuit and chip design using resources accessible over a distributed electronic network such as the Internet.

2) Background

The electronics industry produces ever more advanced chip and circuit designs with the assistance of continuously improving design and verification tools. Chip designs and in particular System on Chip (SoC) designs may contain tens of millions of gates per chip, and will soon be in the range hundreds of millions of gates per chip. Engineers generally require advanced software tools to lay out a chip design and to help manage the huge volume of information associated therewith.

In a high-level view of the electronic design process, a design team takes a product idea from conception to completion over a period of time referred to as "time-to-market." Increased competition has resulted in immense pressure to reduce time-to-market with new products, because the first company to the market with a new product can typically expect to capture and hold a large market share against later competitors. In this environment, a difference as small as a few days between the planned and the actual shipment of a product may make an enormous difference in its profitability and in the revenue it generates.

In the present environment for designing large-scale circuits and complex chips, time and personnel are often short, and budgets are tight. A recent trend to increase design speed and efficiency involves the re-use or recycling of electronic circuit blocks or subsystems, which are alternatively referred to as "cores", "virtual component blocks" or "IPs" (an acronym for "Intellectual Properties," which denotes the proprietary nature of these pre-packaged circuit blocks). Once the design for a virtual component block has been tested and verified, it can be re-used in other applications that may be completely distinct from the application which led to its original creation. Other design groups within the same company as the original designers may achieve this re-use. Alternatively, this re-use may be achieved by other third parties, which purchase, license or transfer the IPs and incorporate the IPs into new designs. For example, an Application Specific Integrated Circuit (ASIC), as used in a cellular phone subsystem, may contain several cores such as a micro-controller as well as a digital signal processor and other components. Although the ASIC as a whole performs a specific function as a cellular phone subsystem, each of the cores within the ASIC design may have a generic use that may be used in other ASICs. After the design for the cellular phone subsystem has been tested and verified, each core could be re-used (as a virtual component block) in, for example, an automotive application. Design reuse of virtual component blocks allows a designer to complete a design much faster than building the entire design from scratch, and avoids the need for debugging, testing and verification of the subsystems embodied in the virtual component block. Examples of virtual circuit blocks or IP cores that are commercially available at present include Viterbi decoders, microcontrollers, digital/analog converters, and encryption/decryption processors, to name a few.

While virtual circuit blocks (i.e., IP cores) provide a means for reducing time-to-market by allowing for the purchase of standard blocks of code, there are a number of barriers to the convenient sale and use of virtual circuit blocks. Although, the re-use of prior core designs reduces total design time the initial search for prior core designs meeting the design criteria of the new ASIC design is in and of itself time consuming and tedious. With regard to quality assurance, for example, there are few, if any, standard methodologies for a designer to be assured of the quality of a virtual circuit block or its suitability for a particular design. Conversely, there are few, if any, standard methodologies for a seller of virtual circuit blocks to demonstrate the quality of the products to prospective customers. Another barrier is protection of the code and/or data comprising the virtual circuit block. Companies providing virtual circuit blocks are in need of a way to track the usage of their products and to protect the code and/or data in those blocks against theft, and such methodologies are preferably unobtrusive, yet allow full access to information required to incorporate those IP cores into a design. Another issue is data format. A virtual circuit block purchased for use in a circuit design must be compatible with the data formats used in that design. However, standards for interfacing with virtual circuit blocks, if they exist, are still evolving. As a result, becoming familiar with an interface format for a virtual circuit block may require a significant amount of work, as well as integrating a virtual circuit block into a circuit design, thus reducing the time advantage obtained through the use of the virtual circuit block. Transaction overhead in the form of high sales and legal costs also discourages sale and use of virtual circuit blocks. For example, legal review by one or both parties is often required with regard to the licensing of virtual circuit blocks.

Another drawback with the present way in which design and verification tools are acquired and used relates to technical support. Vendors often have help lines available to users needing technical support for a given software tool. However, assuming that the engineer gets past the frustrating maze of voicemail and one or more layers of less-knowledgeable first-line support personnel which typically characterize vendor help lines, it often takes a long time for the engineer to explain, and for the support personnel to resolve, an issue with a complex tool as applied to a complex circuit. For serious problems, the vendor may send a field applications engineer to the job site, but it is expensive to do so, and several days may pass before a field applications engineer arrives. During that time, the entire design project may remain at a standstill.

Component selection is also an area that suffers from inefficiencies and unnecessary time delays. An engineer may consult printed catalogs put out by component distributors to learn about and select parts, or may, using the Internet, visit a website of a supplier of manufacturer, where information about components may be found, or may use a search engine to try to gather product information on the Internet. However, searching the Internet for individual components can be time-consuming and tedious. Further, current search engines and methodologies are inefficient and incomplete, and may thus return search results that do not include websites offering components that a designer could beneficially use in a design. Engineers also may receive unsolicited data sheets from manufacturers, but such data sheets are often discarded, lost or forgotten about. Conversely, while the engineer might easily receive data such as IP I/O diagram or other top-level information, engineers may have difficulty receiving vital design information regarding the selected components. As part of the design process it is necessary for the engineers to obtain support data for each of the selected components. With increasing pressures to decrease time to market, it has become more difficult for engineers to spend time talking to supplier or distributor sales representatives, exacerbating the problem of information gathering about components.

Another problem experienced with the chip design process is that knowledge concerning design and verification processes are fragmented, and it is difficult to capture and maintain such knowledge. Attempting to discern through observation and study the individual design processes of many individual engineers is very challenging. Moreover, the design process can rarely be discerned from final blueprints or products, and is generally difficult to determine from draft or working documents. Different engineers will approach design in different fashions, which they may not even be able to articulate. Interviewing engineers to obtain data about the engineering design process is likely to be unproductive, and to consume a tremendous amount of time for a comparatively small payoff. Thus, benefits in training and improved methodologies that could result from metrics regarding the engineering design process continue to go unrealized.

Some attempts at addressing problems caused by fragmented design and verification processes involve exclusive partnering arrangements among companies that specialize in different areas of the design and verification process, in order to narrow the range of products and services that need to be learned by engineers and supported by internal technical staff. For example, a partnership of electronic design companies may include a provider of design verification tools, a provider of electronic components, and a company that ties them together. In the partnership model, compatibility issues can be addressed more easily, because a limited number of companies are involved. Further, increased revenue is created by influencing a customer of one partner at one phase of the design process to utilize the products or services of another partner in a different phase of the design process. However, a partnering arrangement drastically reduces the choices available to a design team, and may prevent the most optimum product from being used.

One approach for expediting the design process is to provide certain types of design and verification tools—in particular, FPGA synthesis tools—at a remote computer farm that can be accessed over the Internet. Under this approach, the FPGA synthesis tools are run on a central server farm, or computer farm, owned by a single applications service provider. A server farm, or computer farm, is generally a network of processors that are linked together to accomplish higher intensity computing tasks. In an illustrative system utilizing this approach, the applications service provider rewrites the interface of each offered FPGA synthesis tool in the Java® computing language, allowing usage of the tool on a wide variety of computing platforms and operating systems through standard, commercially available Internet browsers. A drawback of this approach is that the user is limited to the FPGA synthesis tools resident in the server farm of the applications service provider for which interface code has been written. Furthermore, the Java® language is notoriously slow, which can frustrate engineers and slow down the design and verification process.

It would be advantageous to connect participants in the electronic design process, including end users and suppliers, through a single portal site that facilitates information exchange and commercial transactions. It would further be advantageous to make a wide variety of design and verification tools readily and conveniently available to design engineers, and to allow use of such tools without a large initial capital outlay in either software or hardware. It would further be advantageous to provide a mechanism for pooling knowledge and information concerning chip design techniques, applications, products and tools. It would also be advantageous to provide a convenient means for allowing engineers to incorporate virtual circuit blocks into their designs.

SUMMARY OF THE INVENTION

The invention provides a platform which allows connection over a distributed electronic network, such as the Internet, to a plurality of end user systems to exchange and incorporate IP core designs into new complex circuit designs.

The embodiment provides a design platform in which designers may search multiple catalogs of IP designs and instantly transfer all relevant data regarding the IP into the files of a designer for use in designing new SoC. The platform of the embodiment supports the selection of either internal or external IP and TIP sourcing. The software supporting the design platform is written in modular form so that it may be easily adaptable to support the transfer of all relevant TIP data written in, for example, VHDL or Verilog. Moreover, the modular form of the platform support software allows the design platform the ability to support other hardware languages including developing languages such as System-C. The platform of the embodiment also allows the designer to set up all selected IPs within an overall design, connect the IPs and generate a Netlist of all of the components used in the overall design. The platform of the embodiment further provides an ANSI-C code output which may be compiled and easily used in any of a multitude of verification tools to ensure proper integration and connectivity, as well as basic functional verification of the overall design. Furthermore, the design platform may be customized or modified to generate a source code output in any of a plurality of assembly languages. Once IP selection, integration, and verification are performed, the platform of the embodiment is easily integrated with computer aided synthesis, placement and routing tools for final fabrication. Users accessing the design platform are presented with options in a menu or other convenient format identifying the tools and services available, and are able to more rapidly complete circuit designs by having access to a wide variety of tools and services in a single locale. The design platform may facilitate purchase, lease, or other acquisition of the tools and services offered through it.

In an embodiment, a design platform is implemented through an open portal site which acts as a server in the context of an n-tier client/server network, and allows electronic designers and design teams to utilize a wide variety of previously designed IPs. The open portal site invention in one aspect provides a platform which allows connection over a distributed electronic network, such as the Internet, to a plurality of end user systems to exchange and incorporate IP core designs into new complex circuit designs. In this embodiment, the portal site provides front-end hardware designers a means to search and get access to IPs of hardware components from both internal and external vendor sources. The portal site allows chip designers to search and access various IPs for incorporation into new chip designs. Furthermore, this embodiment allows the chip designer to transfer IP data and code directly through the portal site for immediate IP selection, sourcing, set-up, connection between various IPs, netlist generation, Additionally, an embodiment allows a chip designer to perform integration and connectivity verification as well as basic functional verification directly within the portal site. A platform to facilitate the portal site is written in JAVA to run on any computer and supports IPs written in various hardware implementation languages such as VHDL and Verilog. The software supporting the platform is written in modular form to allow for the support of new description implementation languages such as the developing System-C language.

In another embodiment, a closed portal site is provided on a network such as an Intranet to be used within a closed group of users. The embodiment may be provided as a closed portal site only accessible to a select number of users.

In another embodiment, the design platform is provided on a network of user workstations working together on a LAN. The design platform is written in JAVA to work directly on each user workstation.

Further embodiments, variations and enhancements are also described herein.

BRIEF DESCRIPTION OF DRAWINGS

FIG. 4 is a flow chart illustrating a process for purchasing components by accessing a portal site such as shown in FIG. 2 over a distributed electronic network.

FIG. 5 is a flow chart illustrating a process for verifying the selected IP core blocks individually and collectively.

DETAILED DESCRIPTION OF THE PREFERRED EMBODIMENTS

Figure 1:
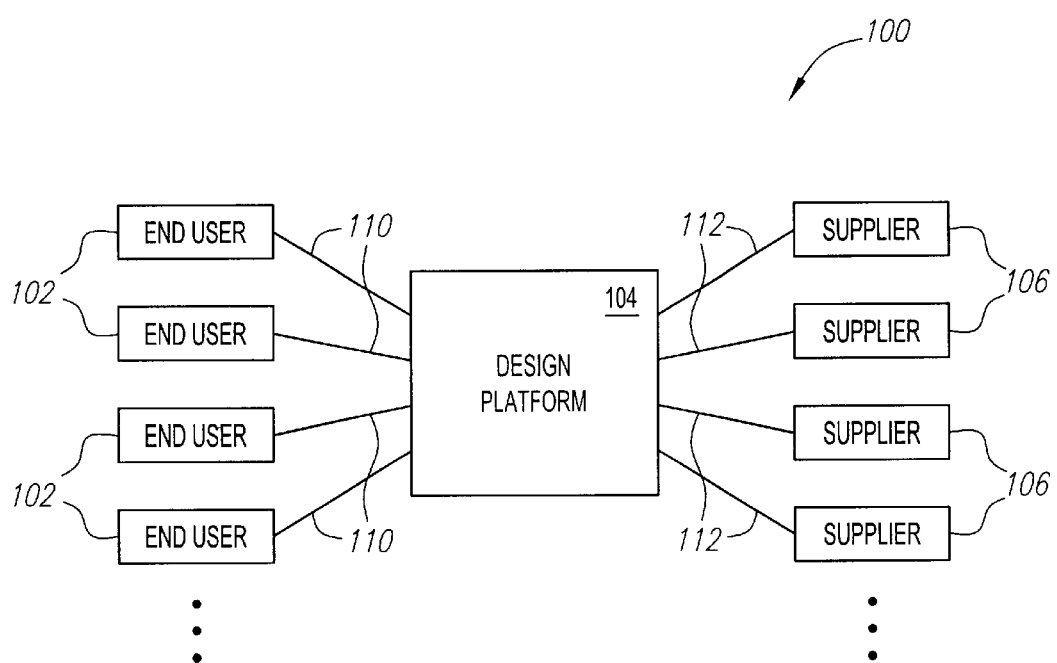
FIG. 1 is an abstract representation of a portal connecting end users and suppliers of electrical design tools and services.

FIG. 1 is an abstract diagram in accordance with an embodiment of a electronic design automation resource system 100 for facilitating electronic design by provision of useful goods, services, information and other resources. As illustrated in FIG. 1, a plurality of end users 102 and a plurality of suppliers 106 are connected, over a distributed electronic network such as the Internet, to a design platform 104. End users 102 would typically include circuit designers and users of electronic design automation (EDA) software tools, but may also include a variety of other types of users, as described in more detail herein. Suppliers 106 typically would include providers of EDA software tools, virtual component blocks or IP cores, foundry services, hardware components, expert design services, and a variety of other resources (whether in the form of goods, services, information or other resources), as further described herein. Alternatively, each end user may also operate as a supplier of IP core designs for other end users. In addition, each supplier may in turn operate as an end user designer.

In an embodiment, a design platform 104 is written in JAVA so as to be run on any computer. The design platform 104 provides engineers and other users 102 access to information on electronic components, and enables commercial transactions between end users 102 and suppliers 106 of the electronic components. In the embodiment, the electronic component data is stored in a remote database in the form of "dynamic parts," having graphical representations with standard symbol and footprint data ready to be transferred (i.e., copied) into an end user's design. Part of the information copied from the remote electronic components database to the end user's workstation (or design database) includes a link to the remote database or a supplier's database, enabling a variety of useful capabilities, including provision of information such as part lead time, availability and cost. Data sheets, timing information and the like regarding the electronic components may also be made available to assist the designer. Additionally, the design platform 104 supports electronic component design data written in either VHDL or Verilog. In this manner the design platform 104 supports any format of IP for immediate interface and integration with other vendor IP in a single SoC design. In addition, by designing the software that supports the design platform in modular form, new implementation languages such as System-C may be supported in the future. Through the link to the remote database or a supplier's database, a front end user may transfer all relevant design data for integration, connection, and verification in the new SoC design. This data allows the embodiment to estimate power consumption, gate count, and area for the complete SoC design.

In another embodiment, the design platform 104 provides an integration tool, which through the transfer of all relevant IP design data allows the designer to set-up the IP core designs within the new SoC design. The design platform 104 supports the necessary connection between the various IP cores and generates a Netlist of all IP core components within the new SoC design.

In another embodiment, the design platform 104 supports a verification of the integration of all IP cores and the connectivity between IP cores. The design platform 104 further supports a verification of the basic functional elements located within each new SoC design. These basic functional elements include Address decoders, Bus arbiters, Bus Bridges, etc. The design platform 104 outputs source code, for example, in ANSI-C code that allows conventional logic simulators the ability to verify the integration and connectivity of the IP cores.

In another embodiment, the design platform 104 connects end users 102 looking for information on virtual circuit blocks or IP cores, or interested in purchasing such, with suppliers 106 offering virtual circuit blocks or IP cores. The design platform 104 may facilitate the locating and acquisition of suitable virtual circuit blocks or IP cores by, for example, providing a catalog of available IP cores, information regarding the IP cores, and access to mechanisms for protecting IP cores from unauthorized user or copying.

In another embodiment, a plurality of the above features of the design platform 104 are combined in an open portal site 204 that provides comprehensive support for the circuit design and development process.

Figure 2:
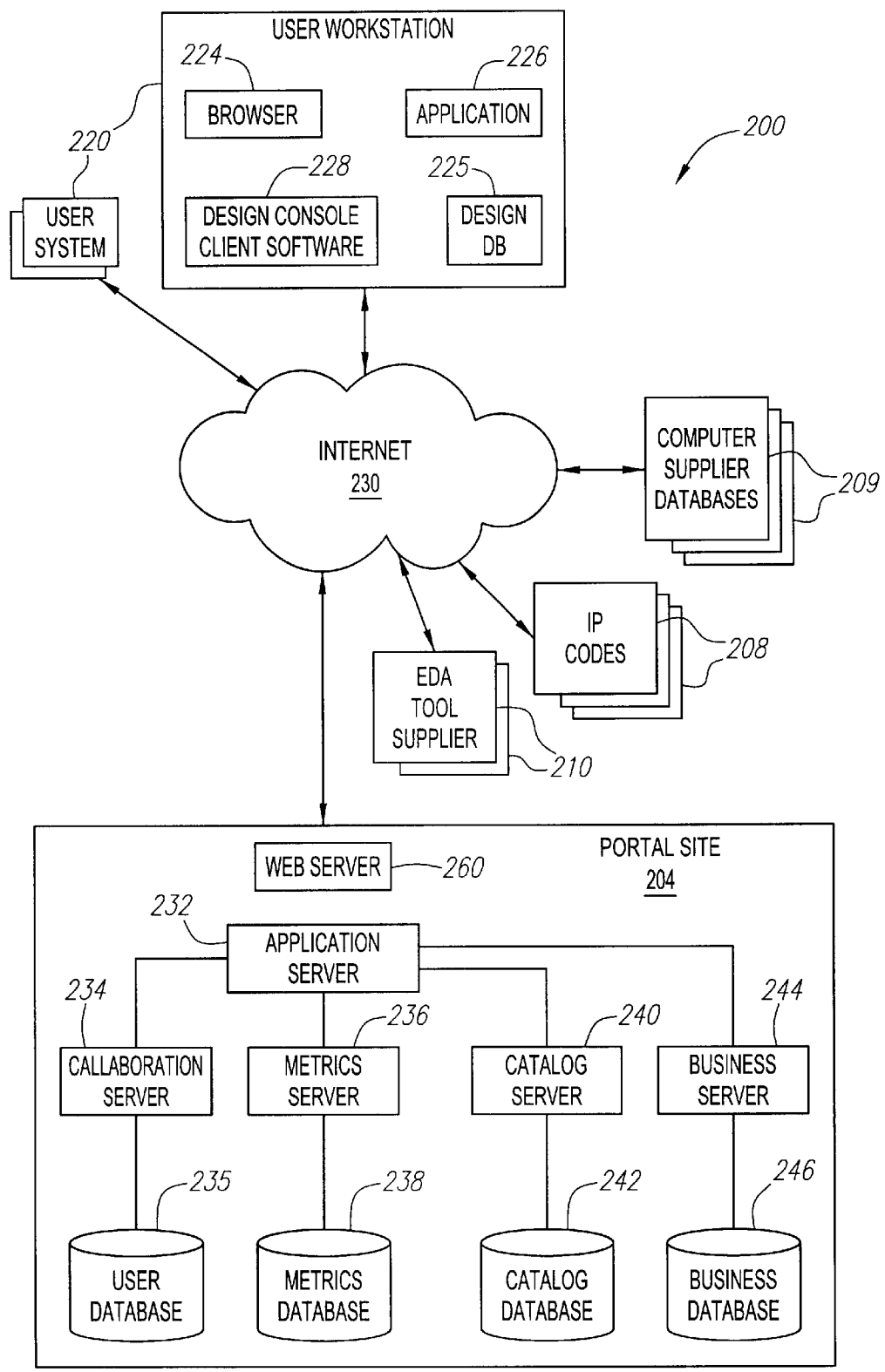
FIG. 2 is a more detailed diagram of a system for facilitating electronic design by connecting end users with suppliers of electrical design tools, services, information and/or other resources.

FIG. 2 is a more detailed diagram of an embodiment featuring the design platform 204 offered as an open portal site. FIG. 2 depicts a system 200 for facilitating electronic design by connecting end users with suppliers of electrical design tools, services, information and/or other resources. As illustrated in FIG. 2, a variety of users and resource providers are connected to a portal site 204 over a distributed electronic network such as the Internet 230, for the purpose of facilitating electronic design. In the system 200 illustrated in FIG. 2, user systems 220 connect using the supporting platform over the Internet 230 to the portal site 204. While only a single user system 220 is shown in FIG. 2 for purposes of illustration, it will be understood that many user systems, on the order of hundreds or thousands, may so connect to the portal site 204 over the Internet 230 or other distributed electronic network. For the purposes of the following discussion, it will be assumed that the user systems are connected to the portal site 204 over the Internet 230, although it will be understood that other types of distributed electronic networks may also be utilized for such connection. Standard object data models may be used to link a user system 220 to the portal site 204 over the Internet 230.

User systems 220 connected to the portal site 204 over the Internet 230 may comprise standalone computers or workstations, which may connect directly to the Internet 230, or may be part of a local area network (LAN) which comprises designated network hardware and/or software for connecting to the Internet 230, or may connect to the portal site 204 through some other means. A user system 220 preferably comprises a means for navigating the Internet 230 such as a web browser 224, which may comprise, for example, a standard commercially available product such as Microsoft's Internet Explorer™, Netscape's Communicator™, or Opera Software's Opera™. The user system 220 also preferably runs one or more supplier applications 226 in the form of computer programs or other software packages, such as, for example, E-Capture™, which is a commercial product available from Cadence Design Systems of San Jose, Calif. A "design console" interface 228 is also preferably provided as part of the user system 220. The design console interface 228 may comprise a standalone client application software program installed on and running on the user system 228. The design console interface 228 acts as an interface with the portal site 204, and is preferably optimized to interlink the functions and processes offered by the portal site 204 in a faster, more robust and more efficient manner than would otherwise be provided by a standard web browser. A universal data interface format or mark-up language, such as XML, is preferably used as a primary data interface between the various components of the system 200. The details of XML are well-known to those in the art of computer programming.

Turning now to the portal site 204 of the system, the portal site 204 acts as an aggregation point for many suppliers 106 (see FIG. 1) in potentially widely different domains. The portal site 204 preferably includes a web server 260 which interfaces with outside entities (such as user system 220) seeking access to the portal site 204, acting as an intermediary between those outside entities and the various applications available at the portal site 204. The portal site 204 also preferably includes an application server 232, which receives requests from outside entities passed through the web server 260 and responds thereto by accessing the databases and other resources included in or accessible through the portal site 204. The application server 232 also serves a command-and-control function within the portal site 204.

The application server 232 preferably accesses one or more databases containing information useful to design engineers, such databases including, for example, a user database 235, a metrics database 238, a catalog database 240, and a business database 244, the functions of which are described later herein. The user database 235 is accessed through a collaboration server 234, the metrics database 238 through a metrics server 236, the catalog database 242 through a catalog server 240, and the business database 246 through a business server 244. Additional databases and servers may be included if desired. Also preferably connected to the portal site 204 over the Internet 230 are one or more component supplier databases 209, IP core databases 208, the role of which will be explained in more detail herein with reference to FIGS. 3 through 10.

The design platform 104 supported by the open portal site 204 further includes design tools, for example, to set up selected IP core blocks, make the proper connections between the various I/O pins of the IP core blocks, and generate a graphical and textual netlist of the complete SoC design.

Furthermore, the portal site 204 further includes verification tools to insure proper integration and connectivity of the IP core blocks within the overall SoC design. The portal site 204 further provides a means to verify basic functionalities of the SoC design. These include the basic address decoder, bus arbiter, bus bridge, etc. functions utilized on a SoC design. The roles of these various tools will be explained in more detail herein with reference to FIGS. 3–7.

One of more of the databases 235, 238, 242, and 246 provided by the portal site 204 may be configured with a distributed architecture, with the portal site 204 accessing information from other sites through secure XML tunnels. In particular, the catalog database 242 may advantageously be configured with a distributed architecture, with the portal site 204 accessing catalog information from remote databases (such as 208 and 209) through secure XML tunnels. Caching may be used where the database architecture is distributed so as to improve access performance.

From a general standpoint, the collaboration server 234 provides collaborative services to both end users 102 and suppliers 106 (see FIG. 1). The collaboration server 234 preferably integrates and serves collaboration-type applications such as chat, calendar, e-mail, online seminars, online conferencing, application and desktop sharing. The collaboration server 234 also preferably provides infrastructure support for expert design assistance through a "virtual" desktop presence, which allows real-time interaction of experts and designers.

The metrics server 236 assists in collecting data on usage of the portal site 204 and supplier services. In one aspect, the metrics server 236 may comprise a high performance, high capacity data store for data measured at the portal site 204. Such data may include, for example, web traffic patterns, application usage, component usage (by monitoring electronic bills of materials, for example), and user rating feedback, among other things. The metrics server 236 preferably provides such information to a specialized portal data mining application.

The catalog server 240 preferably provides "electronic catalog" services to the client side software resident at the user system 220. As noted, the catalog database 242 may be configured in a distributed architecture, and integrated through links and other resources by the catalog server 240 and/or catalog database 242. Supplier catalog integration is preferably accomplished by use of a universal data format model such as XML.

The business server 244 supports business transactions between users and suppliers, as further described herein.

In an embodiment, the portal site 204 provides a variety of useful resources for design engineers. Access to such resources may be conveniently described with reference to FIGS. 3 through 10, each of which illustrates a process for accessing information or other design resources relating to a particular area of design, development or manufacture. The portal site 204 thus, in one aspect, may provide an integrated set of resources for design engineers.

Figure 3:
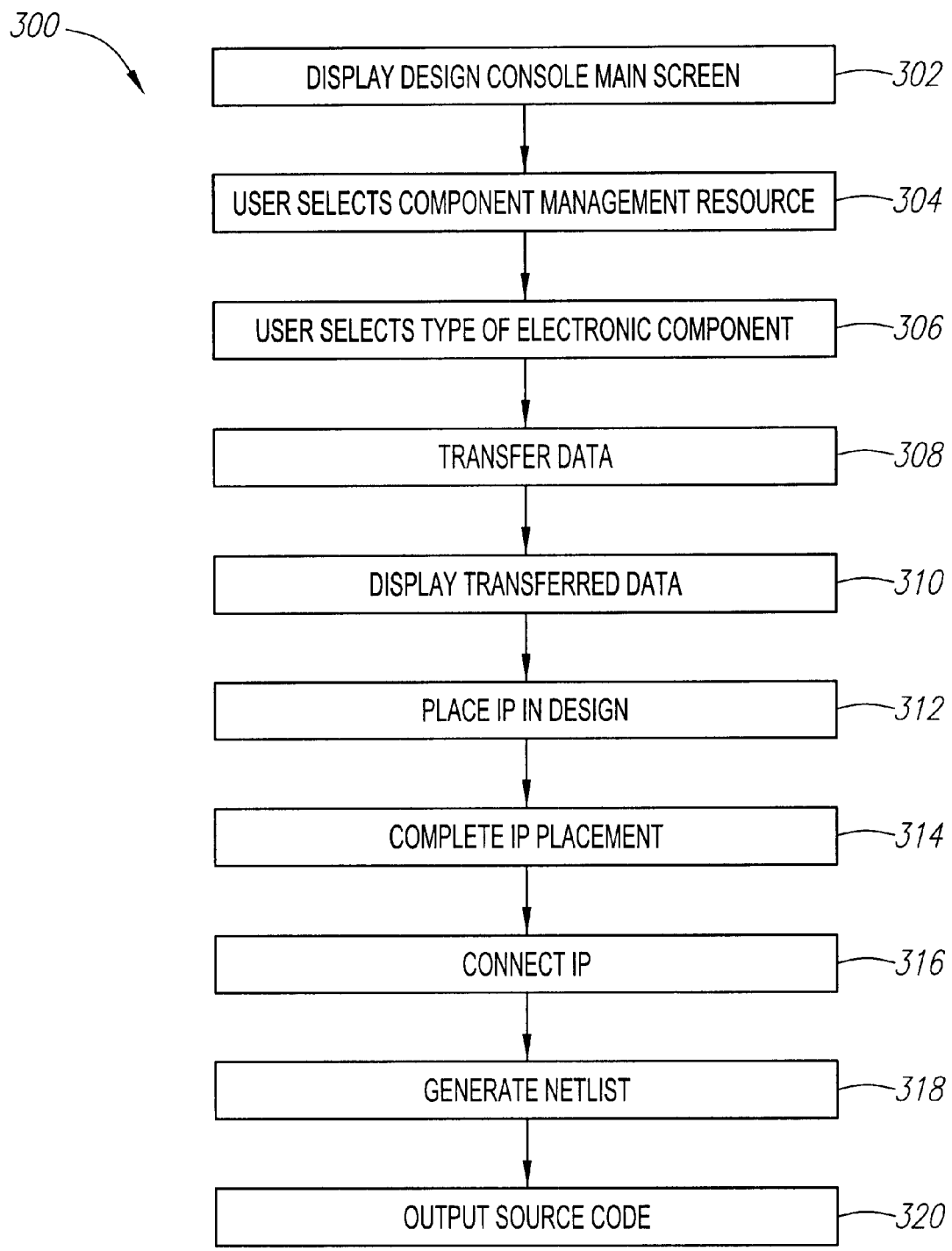
FIG. 3 is a flow chart illustrating a process for selecting and managing components in an electronic design, as may be used, for example, in connection with the system of FIG. 2.

FIG. 3 is a flow chart illustrating a process 300 for designing a SoC from various IP sources, as may be used, for example, in connection with the system of FIG. 2. In a first step 302 of the process 300 depicted in FIG. 3, a user at the user system 220 accesses the portal site 204 via the Internet 230 by entering the appropriate Unified Locator Resource (URL) or other applicable address, and in response the design console client software 228 displays a main design console menu screen on a computer screen at the user system 220. Throughout the described process 300, as well as the other processes described later herein, the display of data at the user system 220 is preferably accomplished by the transmission of appropriate commands over the Internet 230 from the portal site 204; that is, the portal site 204 transmits data through the Internet 230 to the user system 220 in a suitable format (e.g., hyper-text markup language (HTML) or a similar format) where it is then displayed. Means for formatting and transmitting information over the Internet 230 are well known to those skilled in the art of computer programming.

In a next step 304 of the process 300 illustrated in FIG. 3, the user at the user system 220 preferably selects an icon, link or other indicia for the search of various IP core designs fulfilling the necessary design criteria of the SoC design. For example, the user may click on an appropriate icon or link displayed in the design console main screen to search for appropriate IP core designs. Such icons or links are commonly employed in Internet application software, and techniques for placing the icons or links in a graphical user interfaces are well known to those skilled in the computing arts. Alternatively, the component selection search may be accessed in a text-based environment by typing or entering an appropriate command. After searching the various databases connected through the portal site 204, the graphical display of the portal site 204 displays the various choices of IP core designs meeting the necessary design criteria entered by the user. In response to the user's search of IP core designs, a list of different IP core designs available for use or purchase is then retrieved at the portal site 204 from the catalog database 242, and then transmitted to and displayed at the user system 220. Listed IP core blocks may include, for example, virtual micro cores, field-programmable gates arrays (FPGAs), digital signal processors (DSPs), complex processing cores, and any other components a design engineer may find useful. Alternatively, the components may be for a printed circuit board (PCB) prototype of the SoC, which may include many of the same above, listed IP core blocks. The listed components may include basic design parameters and design criteria which allows the user to determine if the IP core is suitable for use within the new SoC design. Such information preferably constitutes relatively high level data, and is generally intended to allow the user 102 to determine relatively quickly whether the user 102 should include the selected IP core in the design, look for a different part from the ranked list, or gather further information about the selected part. Preferably, the user 102 is presented with icons or other interface features for conveniently selecting whether to immediately incorporated the selected part in the user's 102 design, backtrack to the ranked list and look for a different part, or else pull up additional information about the selected part. If the user 102 is interested in additional information, the process 300 proceeds to step 306 and 308, wherein the user 102 selects the appropriate interface feature (e.g., an icon or menu selection entry) to receive additional information about the selected part.

If more than one specific type of part is available for a component, then, in step 306, the user may select the component from the list provided in step 304, which preferably causes display of the available parts corresponding to the particular component, in an ordering as preferably described below with respect to step 310. For example, if the user selects a DSP core as the IP core block, the user system 220 may display the DSP core code name and frequency, power consumption, gate count, and so forth. Alternatively, the user may be permitted to input search criteria to allow a search for all components meeting specified criteria, using, for example, ordinary database queries. For example, the user may search for all DSP core blocks running at a frequency greater than 300 MHz. The user's search criteria may be provided to the portal site 204 over the Internet 230, resulting in an appropriate database search query being executed. The results of the search then may be transmitted back to the user system 220 from the portal site 204 over the Internet 230. In step 306, the user selects from the displayed list of IP designs for integration within the new SoC design. The list of available component designs may be displayed, for example, as a list of selectable strings, "hotlinks" or icons. The user reviews the list of choices and, in step 306, selects one of the available choices by, e.g., highlighting the entry and hitting a keyboard key (such as the return key), or clicking on the entry with a computer mouse, or selecting a number corresponding to the ranking of the desired part, or by any other selection means, the specifics of which are not essential to the operation of the inventive concepts described herein. The user's selection is transmitted from the user system 220 to the portal site 204.

The process 300 then proceeds with step 308, wherein detailed data regarding the selected IP is transferred to the user. In a next step 310, additional information about the part chosen in step 306 is displayed to the user. The user 102 then requests for the transmission of additional information from the external source (208, 209) to the portal site 204 for eventual import to the user's 102 workstation and design. The design platform 104 supported by the portal site 204 then collects the additional information and transmits the information to the end user 102. This additional transferred information from 208, 209 includes VHDL or Verilog real action implementation code as well as data necessary to run design simulations, as well as integration and connectivity verifications. In step 310, further information concerning the selected part is displayed. Such information may include detailed part information such as component data sheets, timing models, application notes, simulation models, signal integrity models (such as IBIS models), manufacturing information, or other information. A symbol and a footprint configuration for the selected part are also preferably provided, which may allow the user to make more informed decisions about placement of components in an overall design. Information displayed in step 310 may also include application notes regarding a component and its applications. The steps for selecting specific IP cores are then repeated, if desired, for other IP cores incorporated into the user's design. Thus, the process 300 returns to step 302 for each remaining IP core for which the user desires to search and select using the resources connected to the platform design 104. Eventually, when the user finishes adding IP cores to the design, the process 300 returns to the general design console menu.

Use of the process 300 illustrated in FIG. 3 is expected to benefit both suppliers and users. For example, the use of the IP cores selection and management process 300 facilitates the exchange of data regarding the quality and features of IP cores, which is beneficial to suppliers who are able to demonstrate such quality and features to end users, and to users who have greater assurance about the quality and functionality of a given IP core. The IP cores selection and management process 300 also provides for protection of the IP cores, which can be important to facilitating the entry of suppliers into the IP marketplace and to protect their intellectual property rights in IP cores they have developed. Additionally, the IP core selection and management process 300 may advantageously reduce overhead for IP core sale and licensing transactions, because such transactions occur between a designer and a supplier via a design platform 104 without the need for intervention by other personnel from sales, marketing or legal departments. Moreover, such a design platform 104 encourages a corporate wide or even industry wide enforcement of standards at both the IP core creation and at the SoC design level.

Once the designer has selected and transferred all relevant information regarding the selected IPs, in an embodiment, the process then continues with step 312, wherein the user 102 places the IP core into the overall SoC design. The IP core placement step 312 may be accomplished by making table entries indicating the appropriate position coordinates of each transferred IP core on the overall design. In addition a user 102 may manually enter table entries indicating the appropriate IP core to IP core connections and IP core to Bus connection. Alternatively, the design platform 104 may also automatically connect IP cores to either other IP cores or buses within the SoC design. This automatic connectivity utilizes the support data files transferred to the user 102 by the design platform 104 in step 308. Moreover, the design platform 104 may incorporate a graphical user interface (GUI) to allow a user 102 the ability to place and move IP cores within a SoC design. The user 102 places and moves a graphical representation (e.g., symbol) of the selected IP core into the SoC design by moving, copying or dragging the symbol of the selected IP core into the schematic program being used to develop the design. In order to enable such a GUI, the original creator of the IP core must also create a symbol for the IP core and the accompanying graphical representation support file. This graphical support file can be transferred with the other support data in step 308. As part of the process of bringing the selected part into the schematic program, information concerning the selected part is preferably copied and stored at the user system 220 in the design database 225. Such information may include, for example, specifications concerning the selected part, as well as manufacturing information and a hyperlink to either the portal site 204 or a component supplier database 209 of the supplier or distributor of the selected part. Because of the link to a remote database, the parts selected from the portal site 204 and stored in the design database 225 at the user system 220 may be referred to as dynamic parts. Instead of storing the information concerning the selected part in the design database 225, it may also be stored, for example, in a separate database at the user's physical location or at some remote location.

Figure 7:
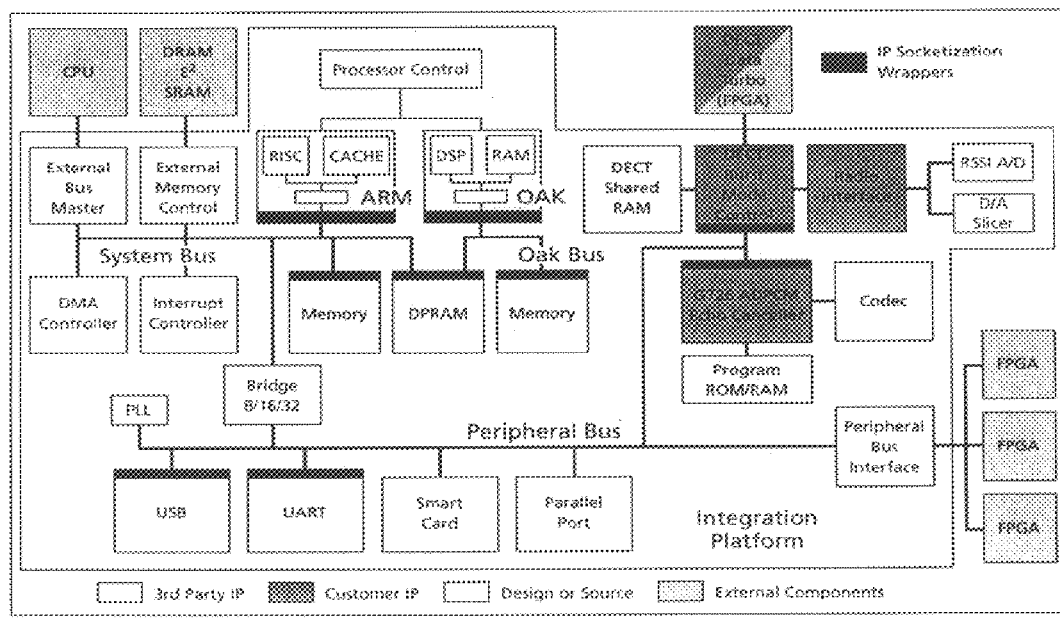
FIG. 7 is an example of a generated graphical high level NETLIST illustrating the selected IP core blocks within an overall high level schematic.

Eventually, when the user finishes adding components to the design, the process 300 moves to step 314, at which the design is considered complete. In step 316, connections between the various I/O pins are made between the various IP cores. The design platform 104 supported by the open portal site 204 offers an auto-connection feature. By use of an auto-connection feature the design platform 104 automatically uses the transferred data regarding each IP core to automatically connect each I/O pin of the IP core to a bus. Alternatively, the user 102 may manually connect the IP core to a bus. Finally, in step 318 a high level netlist 700 is generated. The design platform 104, supported by the portal site 204 outputs the netlist 700 in a description language, such as Verilog or VHDL. In addition, the design platform 104 may provide the user 102 with a graphical representation of the netlist 700. FIG. 7 provides an example of a high level netlist generated in graphical form by the design tools included in the portal site 204. In its generation of the high level netlist, the portal site 204 further includes the transferred software code for each selected IP core for use in the verification process 400. In FIG. 7, various IP cores 701 are graphically represented in a high level netlist 700. Each IP core 701 may represent complex IP designs, for example, a DRAM or DSP. The netlist 700 is provided as output by the design platform 104 in a description language for further logic simulations and verification testing. The graphical representation in FIG. 7 is also provided to the user 102.

In the embodiment where the design platform 104 is supported by a open portal site 204, or in embodiments allowing external IP core sources to be connected to the design platform 104, the embodiments may perform next step 320 and process 400. At a later point, in preparation for manufacturing the design, the process 300 optionally proceeds to step 320, wherein a bill of materials is automatically generated from the components in the design. In addition to generating a bill of materials, all relevant support data regarding the SoC design may be packed into a documentation directory with a corresponding index file. The user may initiate automatic generation of the bill of materials by making an appropriate menu selection using the design console client software 228, or an application 226 at the user system 220, or in some other manner.

FIG. 4 is a flow chart illustrating a process 400 for purchasing components by accessing a portal site 204 such as shown in FIG. 2. The purchasing process 400 may be invoked directly by the user accessing the portal site 204 to purchase one or more items, or else may be automatically invoked in whole or in part in connection with a larger process, such as the component selection and management process 300 illustrated in FIG. 3. In a first step 416 of the purchasing process 400 illustrated in FIG. 4, the user selects a purchase option for a component or part that is displayed to the user on the user system 220. The user may be provided with a list of available parts in a manner similar to steps 304 and 306 illustrated in FIG. 3, or else the user may simply enter the desired part (by model number or designation) if already known, and the entered part information will be compared to parts information stored either at the portal site or available at supplier databases 209. The user may select a purchase option for a particular part by, for example, clicking on a purchase icon or a designated link with a computer mouse, or entering a purchase command on a computer keyboard. Prior to selecting a purchase option for a particular component, the portal site 204 may provide to the user 102 information about the IP core data availability and/or lead time needed for a particular user 102 requested customization or modification to the IP core design. The portal site 204 may also provide to the user 102 information regarding which data may be regularly stored and updated at the portal site 204, or else may be retrieved by the application server 232 on the fly, when needed from the appropriate supplier database 209.

User selection of the purchase option generates a request for a quote, which, in step 418, is transmitted to the portal site 204 from the user system 220 over the Internet 230. At the portal site 204, the application server 232 receives the request for a quote and invokes the business server 248, which accesses the business database 246 to generate a transaction record. The transaction record generated in the early stage of a purchasing transaction may be updated as each step towards a final transaction is completed. In a next step 420, the application server 232 generates a request for a supplier quote and transmits this request via the Internet 230 to the appropriate supplier (which would typically be a site containing a supplier database 209). The request for a supplier quote may or may not include specifics regarding the user 102 that is requesting the quote and the size of the business employing the user 102 as well as the licensing model that the user 102 is willing to consider. In the embodiment, such information is included for the purpose of, among other reasons, enabling the supplier to determine whether or not the purchaser qualifies for certain discounts as commonly offered in the industry, such as volume discounts, or preferred supplier or user discounts. The request for a supplier quote may be tagged with a transaction identifier to facilitate match-up of a responsive price quote from the supplier.

In a next step 422, the supplier preferably transmits a proposed electronic contract, including a price quote and licensing model, to the portal site 204 over the Internet 230. The proposed electronic contract preferably is identified at least in part by the transaction identifier transmitted as part of the request for a supplier price quote. In step 424, the proposed electronic contract is forwarded from the portal site 204 to the user system 220. In the embodiment, the supplier quote is considered by the user and supplier as an offer for sale, and acceptance of this offer by the user creates a binding contract between the user and the supplier, provided that the user has authority to enter into such a contract.

In a next step 426, an authentication procedure is performed to ensure that the user is authorized to make the desired purchase. In one embodiment, for example, the design console client software 228 initiates a procedure to determine whether or not the user is authorized to make a purchase. Such factors will vary from user to user and company to company, and may depend upon such factors as the monetary amount of the purchase to be made, the seniority of the individual making the request, and other such factors. The design console client software 228 preferably stores or has access to data regarding the authorization level of the user. The authorization data may, for example, be stored in a separate database (local or remote) operated by the user's employer, through which transactions requiring payment must pass for authorization. Alternatively, the authorization function may be provided at the application server 232, as the location where the authorization decision is made is not critical to the functionality of the embodiments described herein. As a result of the authentication procedure, the design console client software 228 may not allow the user to purchase the selected part, or it may allow the user to purchase parts up to a certain total dollar value.

If the user is not authorized to make the purchase, then the user obtains authorization, as indicated by step 428. This authorization step 428 may take a wide variety of forms, including electronic authorization, paper authorization, formal approval processes and the like. If the user does not obtain authorization, the process 400 may terminate at step 428.

In step 430, once the user is authorized to make the purchase, then an order is generated to the supplier, and a contract is created between the user and the supplier for the purchase and delivery of desired products or services. The order is then transmitted to the supplier via the portal site 204, as indicated in step 432.

The portal site 204 may have varying levels of involvement in the business transaction. In step 434; for example, a determination is made as to whether or not the portal site 204 is handling the billing for the transaction. If not, then in step 436, the application server 232 may cause an invoice for a portion of the cost of the transaction that passed through the portal site 204 (i.e., a commission for bringing the user and supplier together) to be generated and transmitted from the portal site 204 over the Internet 230 to the supplier. The amount of the commission as reflected on the invoice may be generated based on a percentage of the overall transaction value, on a per transaction basis, or on another basis worked out on mutually agreeable terms between the particular supplier and the operator of the portal site 204. In a next step 438, the supplier then sends the invoiced amount to the portal site 204 as compensation. In the embodiment, invoicing and payment are both electronic in nature; however, one or both of these may be in paper form. For convenience, the supplier may maintain an account at the portal site 204, which gets automatically debited by the amount that would otherwise be invoiced.

Returning to step 434, if the portal site 204 is handling billing, then the process 400 proceeds to step 440, wherein the application server 232 generates an invoice and transmits it from portal site 204 to the user over the Internet 230. In a next step 442, the user then transmits remittance for that invoice to the portal site 204, which may be done electronically or through paper. Alternatively, the user may maintain an account with the portal site 204, which may be electronically debited. Next, in step 444, the portal site 204 optionally deducts a portion of the remitted amount as compensation for acting as an intermediary, and transmits the remainder of the remittance (electronically or in paper form) to the supplier. At that point, the purchasing process 400 is complete.

Once the overall design created in process 300 is complete (and in the event the purchasing of the various selected TIP cores in process 400 from external vendors is necessary), the design platform 104 provides the user 102 with an outputted source code in, for example, ANSI-C or assembly language source code. This source code is provided to the user 102 for verification purposes and may be easily compiled and used in a variety of conventional logic simulators and verification tools to ensure the integrity of the overall design. FIG. 5 is a flow chart illustrating a process 500 for design verification, as may be used, for example in connection with the system of FIG. 2.

Once the individual selected IP core data has been transferred in process 300, the designer may individually test and verify the functions of each transferred IP core in step 502. In order to perform a block level verification process the original designer of the IP core must include a file that identifies not only the type of IP core but also the purpose of the IP core design. Such a file may be transferred along with the Verilog or VHDL file as further support data. Block level verification files are source code files that are easily created by the original IP core creator in, for example, Verilog, VHDL, or ANSI-C. These block level verification files are commonly referred to as test bench files. Currently, block level verification is performed externally because designers do not typically include a test bench file when designing an IP core. This is because most users know what the block level IP core's function is and verification of such a function is simple. Typically, such a test bench file is unnecessary because most users 102 can readily identify and test block level IP core designs. However, as refinements in the design platform 104 of the instant invention are made and use of the design platform 104 increases, it is desirable to fully automate all verification functions. Therefore, future designs of IP cores may have test bench files written to identify the IP core and its function. As more IP cores are designed to include such a test bench file, the design platform 104 may verify the function of the IP core and its complete and accurate transfer. Block level verification involves placing each individual IP core block in a stand-alone basis on a test bench. The block level simulation may be performed using very low VHDL simulators, or perhaps a C simulator. Block level verification insures the integrity of the overall design by verifying a complete and accurate transfer of all IP core block data during process 300. By transferring all support data files with a particular IP core design, the design platform 104 outputs source code file in, for example ANSI-C, that is compiled and executed in a variety of conventional verification and logic simulation tools.

Next in step 504, the design platform 104 verifies the integration and connectivity of the overall design. The purpose of step 504 is to insure that each of the various I/O ports of each individual IP core block has been properly integrated and connected to the other IP core blocks and buses used in the overall design. Support data, such as 110 pin data, register map data, etc. which accompanies the real action implementation code (written, for example, in either VHDL or Verilog) during the transfer process 300 is used in step 504 to verify proper integration and connectivity of IP core blocks. IP core specific parameters are configured by the user 104 via the design platform 104 and are included in the netlist generated by the design platform 104. As discussed above, the design platform 104 generates a real action implementation code for the entire SoC netlist in, for example, Verilog, VHDL, or some other hardware language. In step 506, the design platform 104 generates the real action implementation code netlist to generate a source code file in, for example, ANSI-C or any assembly language for purposes of design verification. As discussed above, the generated netlist and the verification source code file is compiled and may be utilized by a variety of logic simulators. The logic simulator is used in step 508 to verify the integration and connectivity of the IP core blocks with the overall design represented by the generated netlist. Conventional methods require the overall designer to write a piece of C code or assembly language code, compile the written code for utilization by a variety of logic simulators. In the embodiment, the design platform automatically utilizes the transferred data files to generate the C code (or assembly language code) for integration and connectivity verification.

Once the integration and connectivity of the overall design is verified, the design platform 104 provides an overall design functional verification in step 510. In every SoC design, basic functional elements are placed on the design to perform basic tasks such as address decoders, bus arbiter, bus bridge, etc. It is necessary to verify the functionality of these basic components. The design platform 104 includes the proper verification tools to simulate the operations of these basic elements.

If during any of the verification process 500 an error in IP core block designs occurs the design platform 104 provides access to the original IP core block designer through the network, for example the Internet 230, to inform the IP core block designer and any other designer who uses the IP core block of the error. Once a correction to the original IP core design is made, the design platform 104 is capable of automatically transferring the corrected IP core design to all users 102 who have incorporated the IP core in new SoC designs. Thus, an embodiment provides a means to track defects in IP core block design. Moreover, once the defect in the IP core block is corrected, the design platform 104 provides a means to propagate the correction to all users of the IP core block.

Once the overall SoC design netlist has been generated, the design platform 104 allows each front end user 102 to incorporate the netlist design output and accompanying software with a variety of well known synthesis as well as place and route tools to fabricate the final design.

It will be appreciated that a design platform 104 has been described having a wide variety of features, and a great deal of flexibility, for connecting circuit designers and engineers with suppliers and other resources useful to the design process. The design platform 104 preferably provides an open infrastructure capable of accommodating a growing number of users and suppliers. Indeed, it is contemplated that the efficiency and utility of the system increases as the number of suppliers increases. As the number of suppliers increases, more services and goods are available, and the system is better able to meet the comprehensive needs of the users. The system also facilitates the participation of small suppliers, because the up-front cost of linking to the portal site can be much less than what the supplier might otherwise spend on overall sales and marketing efforts. From the perspective of the users, access to a larger number of EDA software tools on a peruse or other short-term basis is greatly expanded, rendering such tools more affordable and making them available to a larger number of end users.

In an embodiment, the portal site 204 facilitates appropriate connections between different services and processes offered through the portal site 204. For example, a user may license an IP core from an IP core supplier 208 using the features of the portal site 204, request expert assistance from a design expert 203 (located and contacted through the portal site 204) for integrating the licensed IP core into a larger design, simulate the overall design (including the licensed IP core) using software obtained through the portal site 204 from an EDA tool supplier 210, and run the simulation on a computer farm 205 also made available through the portal site 204.

Figure 6:
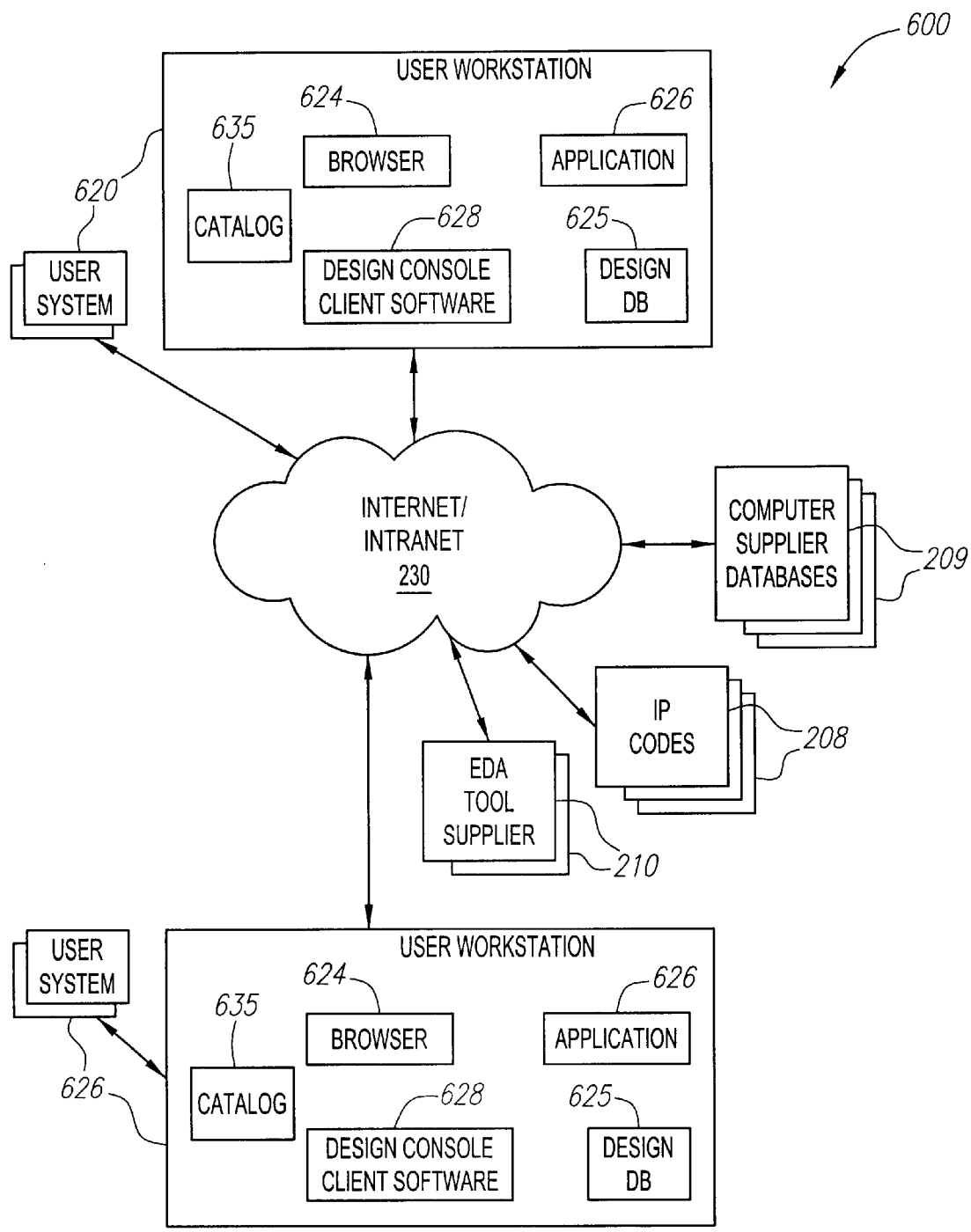
FIG. 6 is a more detailed diagram of an alternative system for facilitating electronic design by connecting end users with suppliers of electrical design tools, services, information and/or other resources.

An embodiment has been discussed in FIGS. 2–5 as a design platform 104 supported by a portal site 204 with open access over the Internet 230. Another embodiment of the invention is capable of providing a closed portal site over the Internet 230. The closed portal site is accessible by only a select group of users 102 and suppliers 106. This users 102 and suppliers 106 may be wholly internal design groups with the network of workstation 220 of a single entity or may include various external users 102 and suppliers 106 linked together over the Internet 230. Further, FIG. 6 illustrates an embodiment of the invention where the design platform 104 is loaded onto the application memory core 626 of the user workstation 620. While only two user workstations 620 are shown, clearly a plurality of user workstations 620 may be connected over a LAN or Internet/Intranet 630. Each workstation 620 may access IP core design of other workstations 220 through the Internet 230 or alternatively through an Intranet. As the design platform 104 is written in JAVA, the design platform is capable of operating on any type of computer workstation 620. Each user workstation 620 would also include a catalog of designs 635 which stores the users IP core designs and support files. Thus, the features of the design platform 104 supported by open portal site 104 are equally supported by this various embodiments. Examples of circuit design platforms supported by a portal site are disclosed in, for example, U.S. patent application Ser. No. 09/514,757 (Attorney Docket No. 247/237), filed Feb. 28, 2000. U.S. patent application Ser. No. 09/514,757 (Attorney Docket No. 247/237) is incorporated herein by reference.

Figure 8A:
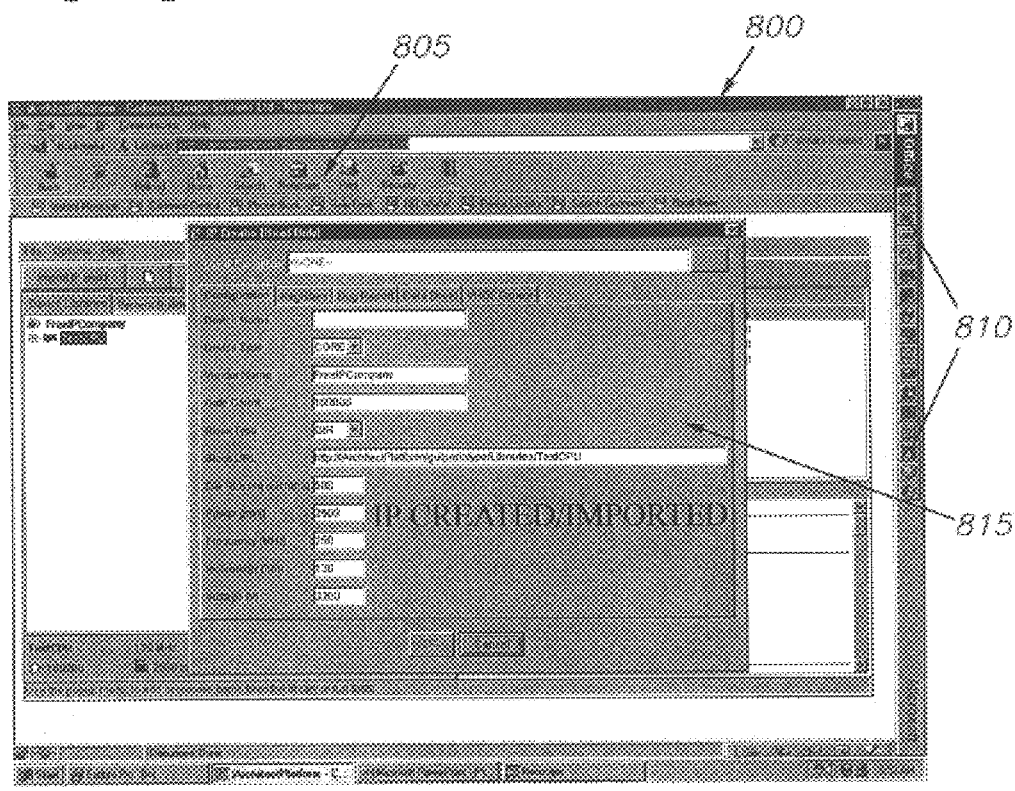
FIGS. 8a–8d illustrates an example of a graphical user interface represented to a user of various steps of the circuit chip design platform using the invention.
Figure 8B:
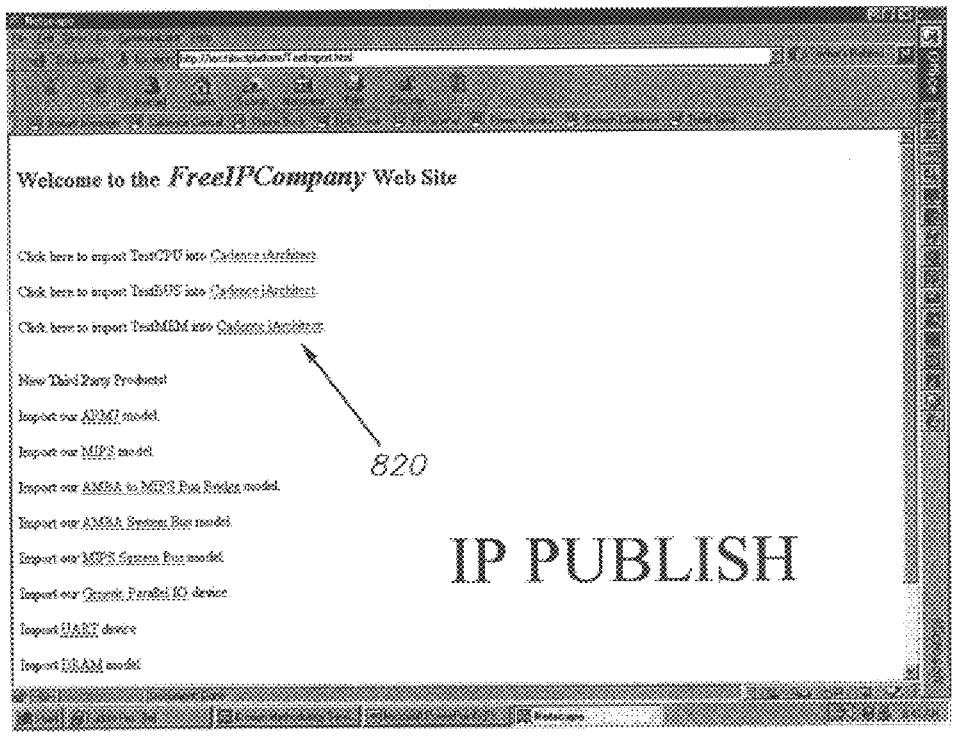
Figure 8C:
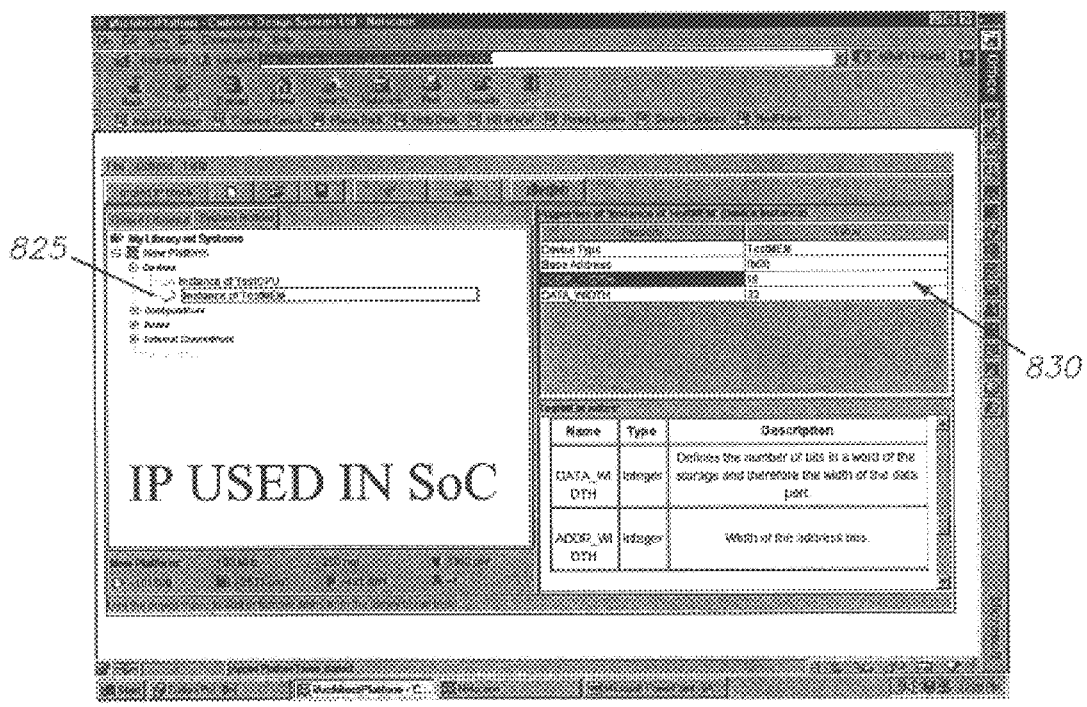

Furthermore, the various embodiments and features of the invention discussed above may be presented to a user through a graphical user interface (GUI). FIGS. 8a–8d and FIG. 9 illustrate exemplary GUI screen shots of various stages of the circuit design platform. For example, FIG. 8a depicts a GUI presented to the user when either creating an IP core or searching an appropriate IP core for importation into a SoC design. The GUI screen 800 contains various icons and tool bars 805, 810 that may selected through either a keyboard or mouse. Selection of icons 805 or tools found on the toolbar 810 may, for example, provide the user 102 with a window 815. Window 815 provides the user 102 with various design parameters that may help to categorize newly created IP cores or provide the user 102 with a means to provide key features desired during a search for IP cores. In step 304, a user 102 may use the search engine supported by the design platform to find various remotely located IP core resources. Window 815 provides the user with a means to select key design features desired among the various IP cores. Once an IP core is created, it is stored to a database 225 connected to various user workstations. Once the IP core is created and stored, the IP core may be displayed, for example, in GUI page as shown in FIG. 8b. As shown in FIG. 8b, the screen 800 may display various links to the stored IP core data. FIG. 8b illustrates an example of a GUI page for an IP core creator to publish the IP core design. A SoC designer/user 102 may search the network of user workstation for an IP core meeting specific design criteria. Next the user 102 may select the appropriate link on the IP publishing page shown in FIG. 8b to initiate the component data file transfer. The GUI page illustrated in FIG. 8c may provide the user with a means to determine when the transmission of component data files is complete. The user 102 is provided with a GUI page, such as shown in FIG. 8c listing the various IP core data files that have been transferred. In FIG. 8c the user 102 is provided with an icon depicting various IP component data file folders 825. Specifics of the data stored in each folder 825 may be presented to the user 102 in the GUI window 830.

Figure 8D:
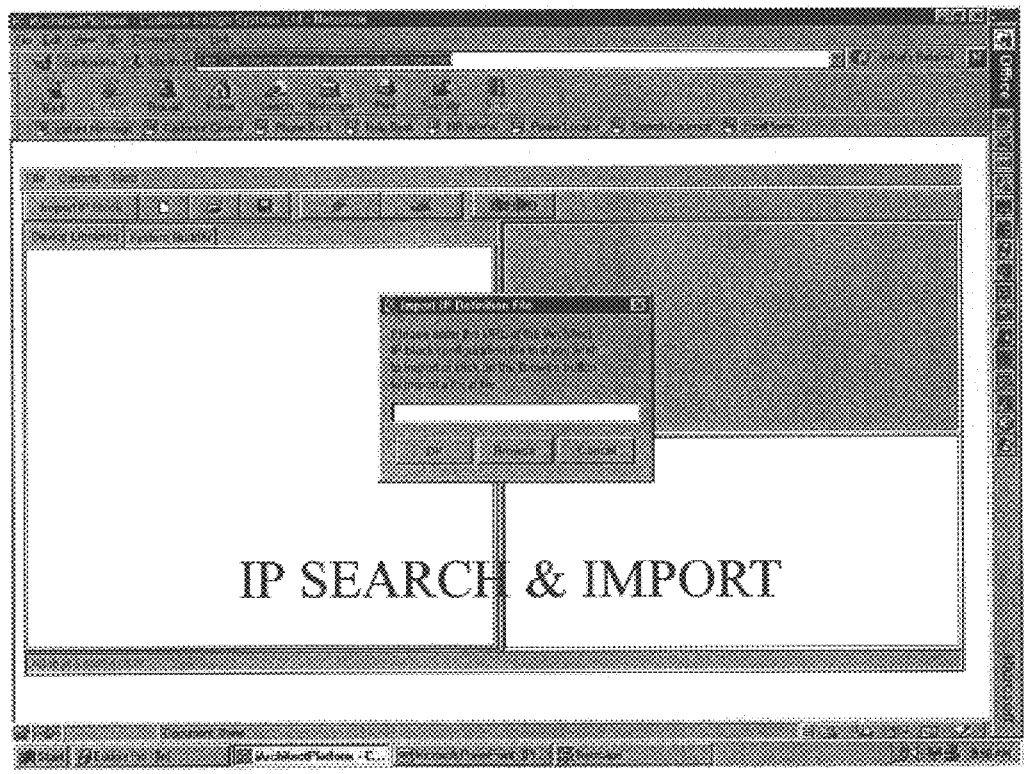
Figure 9:
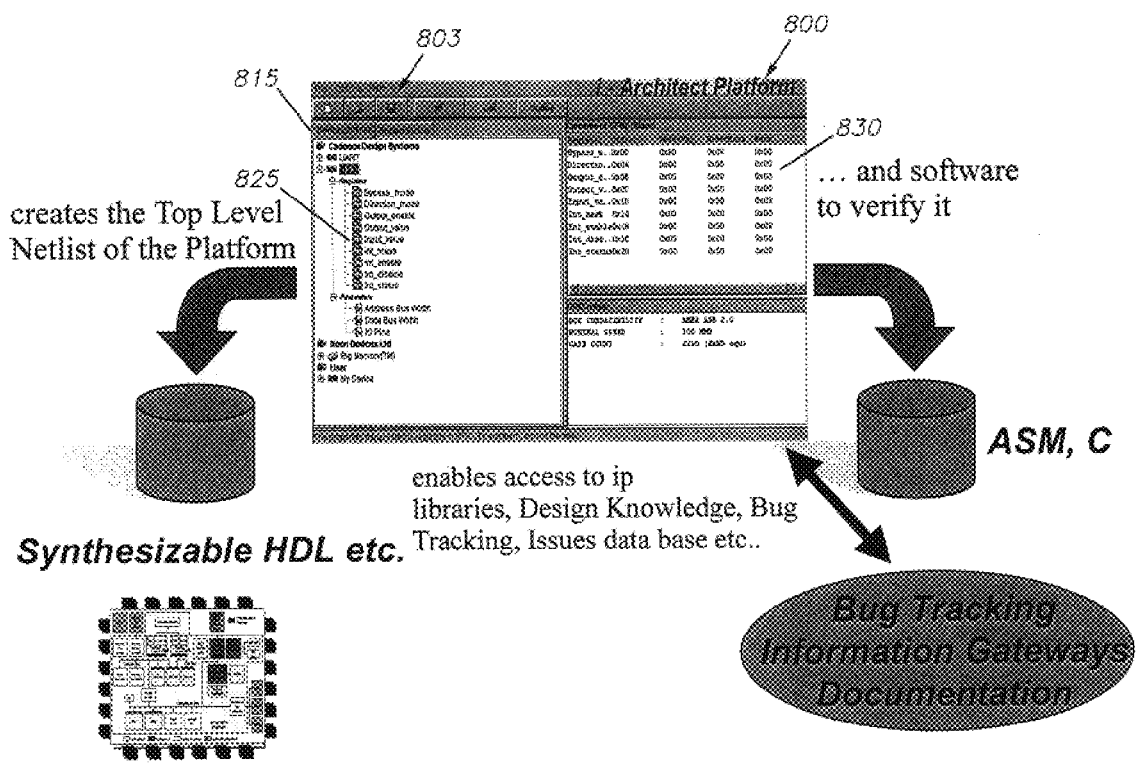
FIG. 9 illustrates an example of a graphical user interface represented to a user of a generated netlist of components.

Once the import of all IP core data files is complete the user may initiate SoC integration and connection. FIG. 8d provides an example of a possible GUI to indicate to the user 102 which IP core are being placed with an overall SoC design. Once the IP cores are placed and integrated within the user's 102 SoC design the circuit design platform generates a netlist of all the components included within the overall SoC design. FIG. 9 illustrates an exemplary GUI of a netlist output. As shown in FIG. 9, the screen 800 includes icons 805 and a toolbar 810. Further, FIG. 9 depicts folder icons 825 representing the various component data files of each IP core. Each folder 825 may be selected to further display a list of all source code files 830 supporting each IP core component data file. The displayed list of source code files 830 may include such files as power usage models, pin diagrams, verification files, etc. Additionally, selection of each of these source code files may subsequently be selected to display the actually source code to the user 102. Modifications and edits of the source code file via the GUI, may allow the user to alter or customize the IP core design to meet specific SoC design parameters.

Figure 10:
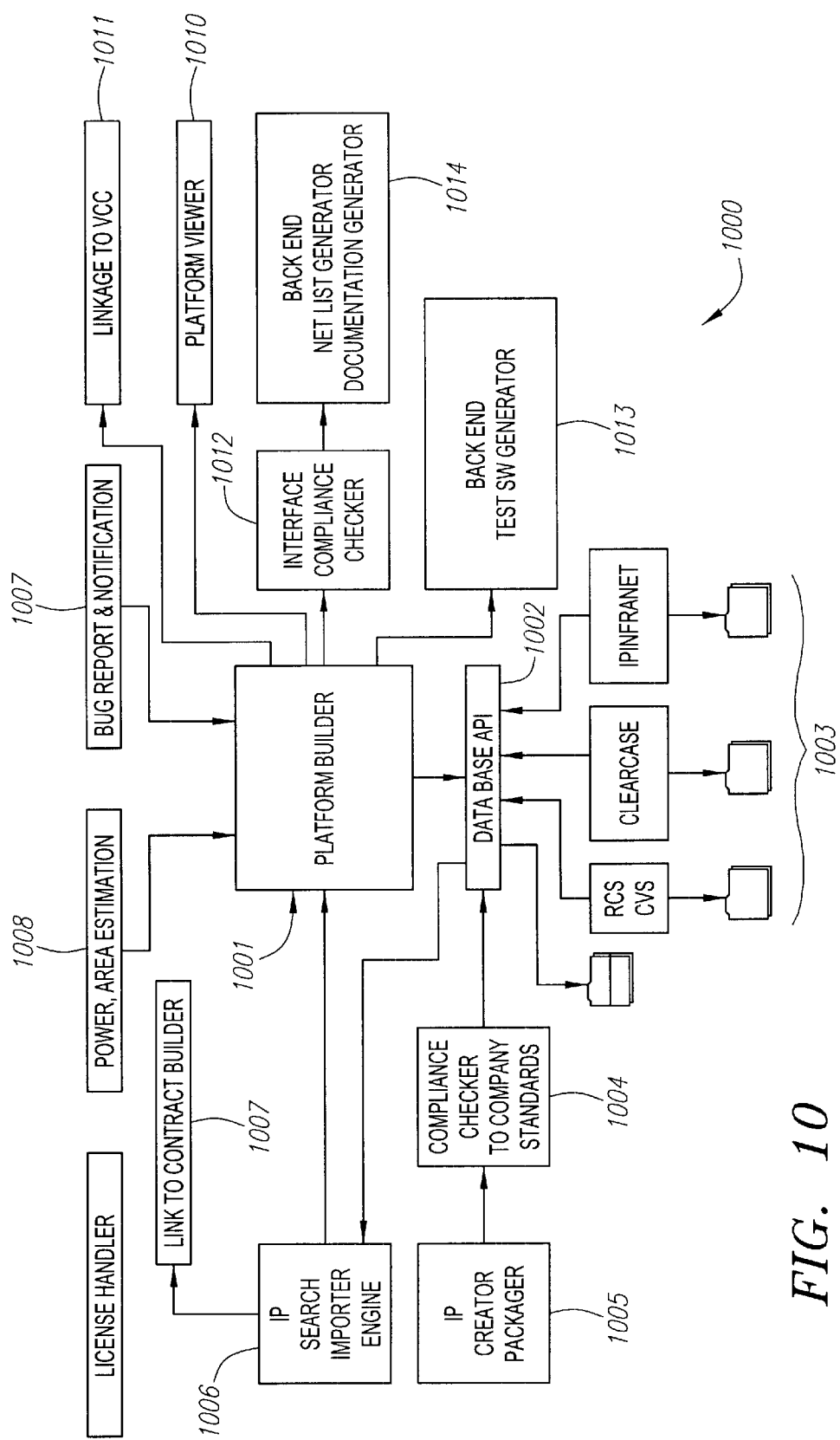
FIG. 10 illustrates a block diagram of various features and implementations that may be included with the circuit design platform of the present invention.

FIG. 10 illustrates in block diagram form various features included in the present invention. System 1000 includes at the center a platform builder 1001. The platform builder 1001 is linked to various features, any combination of which may comprise various embodiments of the invention. For example, the platform builder 1001 is linked to a database 1002. The database 1002 stores folders 1003 containing both created and imported IP core component data files. The data base 1002 may also be connected to a compliance checker 1004 to insure that new SoC designs comply with the design standards of the client or company. The compliance checker 1004 may be connected to the IP creator package 1005, thus each newly created IP core complies with all company standards. The platform builder 1001 may be further connected to a IP core search engine 1006. The search engine may allow users 102 using the platform builder 1001 to search for IP cores created by remote sources. The IP core search engine 1006 may further be linked with a contract builder 1007 that provides simple technology transfer or licensing to occur between the user 102 and third party vendors 103. The platform builder 1001 may further be connected to either a power/area estimation 1008 and/or a bug report notification system 1009. Moreover, the platform builder 1001 may be connected to a platform viewer 1010 or be lined to a VCC 1011. Furthermore, the platform builder 1001 may also be connected to a Interface compliance checker 1012 and test generator 1013. The Interface compliance checker 1012 is further connected to a netlist generator 1014 to provide the source code output of all elements existing on the overall SoC design.

A method for facilitating circuit design and providing design tools and services to users on a commercial basis has been disclosed, along with some of the attendant advantages thereof. It will be apparent, however, that various changes may be made in the form, content and arrangement of the systems and/or process steps without departing from the spirit and scope of the invention, the systems and methods herein before described being merely a preferred or exemplary embodiments thereof. Therefore, the invention is not to be restricted or limited except in accordance with any appended claims and their legal equivalents.

What is claimed is:

1. A circuit design platform, comprising:
   a computer system comprising a catalog database, said computer system accessible over a distribute electronic network, said catalog database storing component data for use in different stages of a design process;
   an application server run on said computer system, said application server connected to said catalog database, said application server further comprising:
   a search engine for searching the distributed electronic network for specific component data;
   a circuit integrator for placing components within an overall circuit design;
   a component connector for connecting components placed on the overall circuit design;
   a netlist generator for generating a source code netlist of an overall chip design, said source code netlist including component position and connection data;
   a verification source code generator for generating source code compiled and executed by a variety of logic simulators; and a network interface managed by said computer system for making and receiving requests to access said component data on other computer systems over said distributed electronic network.

2. The circuit design platform of claim 1, wherein said component data for use in different stages of the design process comprises a list of available electrical components.

3. The circuit design platform of claim 2, wherein said component data for use in different stages of the design process comprises support data files for use with each available electrical component.

4. The circuit design platform of claim 3, wherein said support data files include component data sheets, timing models, application notes, simulation models, I/O pin data, register map data, verification source codes, power data models, area data models, test bench files, bug tracking reports, and signal integrity models.

5. The circuit design platform of claim 1, wherein said catalog database comprises electronic links to one or more supplier databases.

6. The circuit design platform of claim 1, wherein said network interface receives requests for transfer of component design files, and in response thereto, said application server forwards said component design files to a remote computer system accessible through a distributed electronic network.

7. The circuit design platform of claim 6, wherein said component design files are made accessible to remote users for a designated fee.

8. The circuit design platform of claim 1, wherein said application server contains source code written in JAVA.

9. The circuit design platform of claim 8, wherein said application server supports an open portal site.

10. The circuit design platform of claim 8, wherein said application server supports a closed portal site.

11. A method of designing a circuit using resources from a plurality of users, comprising the steps of:
storing a plurality of component data files on a first database connected to a first user system;
connecting, on a demand basis, a second user system to said first user system over a distributed electronic network, said first user system comprising a first application server interconnected with the first database, said second user system comprising a second application server interconnected with a second database;
receiving requests from said second user system for access to any of a plurality of component data files stored on the first database;
searching the plurality of component data files stored on the first database by said second user system;
receiving, from said first user system over said distributed electronic network, a component selection of one of said available electronic components;
selecting by said second user system at least one of a plurality of component data files stored on the first database;
retrieving further information regarding the selected electronic component;
transmitting at least one component data file via the distributed electronic network from the first user system to the second user system;
integrating a first component represented by a first transmitted data file within a circuit design;
interconnecting the first component to elements existing on the circuit design;

generating a netlist source code of the circuit design using the at least one component data file;
verifying a function of the first component using the transmitted component data files; and
generating a verification source code of the integrated and connected components of the circuit design from the transmitted component data files.

12. The method of claim 11, wherein said step of storing component data files comprises storing a real action implementation code and support data files in either hardware language, text, C-code, or assembly language.

13. The method of claim 11, wherein said steps of searching, selecting, integrating, interconnecting, reviewing, and generating of a netlist and verification file are supported by a graphical user interface.

14. The method of claim 11, wherein said step of interconnecting is automatically performed by the second user system using the transmitted component data files.

15. The method of claim 11, further comprising the steps of providing a graphical user interface at the first and second user systems, receiving at said first and second user systems an input selection corresponding to one of said component data files, and transmitting from said second user system to said first user system an indication of said input selection,
wherein said step of receiving requests from said second user system for access to any of said plurality of component data files stored in said first database comprises the step of receiving said indication of said input selection at said second user system.

16. The method of claim 11, wherein said distributed electronic network comprises the Internet.

17. The method of claim 16, wherein said application servers support an open portal site allowing open access to any user workstation connected to the Internet.

18. The method of claim 16, wherein said application servers support a closed portal site allowing open access to select user workstations connected to the Internet.

19. The method of claim 11, wherein said second user system automatically receives an updated component file from said first user system when a modification is made to the transmitted component data file.

20. The method of claim 16, wherein said component data file comprises a link to suppliers of said available electronic components.

21. A system for designing a circuit using resources from a plurality of users, comprising:
a first database for storing a plurality of component data files, said first database connected to a first user system;
a network manager for connecting, on a demand basis, said first user system to a second user system over a distributed electronic network, said first user system comprising a first application server interconnected with the first database, said second user system comprising a second application server interconnected with a second database;
a network interface for receiving requests from said second user system for access to any of a plurality of component data files stored on the first database and for transmitting at least one component data file via the distributed electronic network from the first user system to the second user system;
a search engine for searching the plurality of component data files stored on the first database by said second user system;
means for selecting by said second user system at least one of the plurality of component data files stored on the first database;

a circuit integrator for integrating a first component represented by a first transmitted data file within a circuit design;

a circuit component connector for interconnecting the first component to elements existing on the circuit design;

a netlist source code generator for generating a netlist source code of the circuit design using the at least one component data file;

a component function verifier for verifying a function of the first component using the transmitted component data files; and a circuit verification file generator for generating source code files compiled and executed by a plurality of logic simulators.

22. The system of claim 21, wherein the component data files stored on the first database comprise real action implementation code in a hardware language and said support data files are stored in an assembly language.

23. The system of claim 21, wherein said search engine, means for selecting, circuit integrator, circuit component connector, and netlist generator are supported by a graphical user interface.

24. The system of claim 21, wherein said circuit component connector further comprises an automatic component connector using the transmitted component data files.

25. The system of claim 21, wherein said distributed electronic network comprises the Internet.

26. The system of claim 25, wherein said application servers support an open portal site allowing open access to any user workstation connected to the Internet.

27. The system of claim 25, wherein said application servers support a closed portal site allowing open access to select user workstations connected to the Internet.

28. The system of claim 21, further comprising a bug tracker which automatically delivers an updated component file to the second user system from said first user system when an error is detected in the transmitted component data file.

29. A computer-readable medium on which is embodied a set of programmed instructions that cause one or more processors to perform a sequence of steps, said steps comprising:

storing a plurality of component data files on a first database connected to a first user system;

connecting, on a demand basis, a second user system to said first user system over a distributed electronic network, said first user system comprising a first application server interconnected with the first database, said second user system comprising a second application server interconnected with a second database;

receiving requests from said second user system for access to any of a plurality of component data files stored on the first database;

searching the plurality of component data files stored on the first database by said second user system;

receiving, from said first user system over said distributed electronic network, a component selection of one of said available electronic components;

selecting by said second user system at least one of the plurality of component data files stored on the first database;

retrieving further information regarding the selected electronic component;

transmitting at least one component data file via the distributed electronic network from the first user system to the second user system;

integrating a first component represented by a first transmitted data file within a circuit design;

interconnecting the first component to elements existing on the circuit design;

generating a netlist source code of the circuit design using the at least one component data file;

verifying a function of the first component using the transmitted component data files; and generating a verification source code of the integrated and connected components of the circuit design from the transmitted component data files.

30. The computer-readable medium of claim 29, wherein said set of programmed instructions is stored on an application server run on a computer system.

31. The computer-readable medium of claim 30, wherein said set of programmed instructions is written in any computer language.

32. A system for designing a circuit chip, comprising:

a computer system comprising a catalog database, said computer system accessible over a distributed electronic network, said catalog database storing component data for use in different stages of a design process;

an application server run on said computer system, said application server connected to said catalog database, said application server further comprising:

a circuit design platform; and a network interface managed by said computer system for making and receiving requests to access said component data on other computer systems over said distributed electronic network.

33. The system of claim 32, wherein the circuit design platform further comprises a search engine for searching the distributed electronic network for specific component data.

34. The system of claim 32, wherein the circuit design platform further comprises a circuit integrator for placing components within an overall circuit design.

35. The system of claim 32, wherein the circuit design platform further comprises a component connector for connecting components placed on the overall circuit design.

36. The system of claim 32, wherein the circuit design platform further comprises a netlist generator for generating a source code netlist of an overall chip design, said source code netlist including component position and connection data.

37. The system of claim 32, wherein the circuit design platform further comprises a verification source code generator for generating source code compiled and executed by a variety of logic simulators.

38. A method of designing a circuit using resources from a plurality of users, comprising the steps of:

storing a plurality of component data files on a first database connected to a first user system;

connecting, on a demand basis, a second user system to said first user system over a distributed electronic network, said first user system comprising a first application server interconnected with the first database, said second user system comprising a second application server interconnected with a second database;

receiving requests from said second user system for access to any of the plurality of component data files stored on the first database;

searching the plurality of component data files stored on the first database by said second user system;

receiving, from said first user system over said distributed electronic network, a component selection of one of said available electronic components;

selecting by said second user system at least one of a plurality of component data files stored on the first database;

retrieving further information regarding the selected electronic components;

transmitting at least one component data file via the distributed electronic network from the first user system to the second user system; and generating an overall circuit design and accompanying overall circuit support files using the transmitted component data files.

39. The method of claim 38, wherein the step of generating an overall circuit design further comprises integrating a first component represented by a first transmitted data file within a circuit design.

40. The method of claim 38, wherein the step of generating an overall circuit design further comprises interconnecting the first component to elements existing on the circuit design.

41. The method of claim 38, wherein the step of generating an overall circuit design further comprises generating a netlist source code of the circuit design using the at least one component data file.

42. The method of claim 38, wherein the step of generating an overall circuit design further comprises verifying a function of the first component using the transmitted component data files.

43. The method of claim 38, wherein the step of generating an overall circuit design further comprises generating a verification source code of the integrated and connected components of the circuit design from the transmitted data files.

44. A method of circuit design using remote IP component resources comprising the steps of:

importing source code files of previously designed IP components from remote databases linked through a distributed electronic network;

assembling the imported source code files of previously designed IP components in a single circuit design; and generating source code and support files representing the single circuit design.

* * * * *